(12) United States Patent
Mosley et al.

(10) Patent No.: US 8,768,529 B2
(45) Date of Patent: Jul. 1, 2014

(54) GRID FREQUENCY RATE LIMITING SYSTEM

(75) Inventors: Matthew John Mosley, Simpsonville, SC (US); John Rogers Huey, Greenville, SC (US); Christopher Eugene Long, Greer, SC (US)

(73) Assignee: General Electric Company, Schenectady, NY (US)

( * ) Notice: Subject to any disclaimer, the term of this patent is extended or adjusted under 35 U.S.C. 154(b) by 1015 days.

(21) Appl. No.: 12/839,699

(22) Filed: Jul. 20, 2010

(65) Prior Publication Data

US 2012/0022712 A1  Jan. 26, 2012

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *F02D 29/06* | (2006.01) |
| *H02P 9/04* | (2006.01) |
| *F01D 15/10* | (2006.01) |

(52) U.S. Cl.
USPC ............. 700/297; 700/286; 290/40 B; 290/52

(58) Field of Classification Search
USPC .......................... 700/297, 286; 290/40 B, 52
See application file for complete search history.

(56) References Cited

U.S. PATENT DOCUMENTS

| 6,118,187 | A  | * | 9/2000  | Hepner et al. ............... 290/40 B |
| 6,250,877 | B1 |   | 6/2001  | Westphal et al. |
| 2007/0013414 | A1 | * | 1/2007 | Paillet et al. ..................... 327/50 |
| 2007/0198133 | A1 | * | 8/2007 | Hirst ............................. 700/295 |
| 2009/0037144 | A1 | * | 2/2009 | Nagafuchi et al. ............ 702/183 |
| 2009/0125207 | A1 | * | 5/2009 | Nomura et al. ................ 701/100 |
| 2009/0299540 | A1 | * | 12/2009 | Abi-Samra .................... 700/295 |
| 2010/0072817 | A1 | * | 3/2010 | Hirst .............................. 307/31 |
| 2011/0094238 | A1 | * | 4/2011 | Mosley .......................... 60/773 |

FOREIGN PATENT DOCUMENTS

| EP | 0425835 A3 | 5/1991 |
| EP | 0858153 B1 | 8/1998 |

* cited by examiner

*Primary Examiner* — Kavita Padmanabhan
*Assistant Examiner* — Jason Lin
(74) *Attorney, Agent, or Firm* — Hoffman Warnick LLC; Ernest G. Cusick

(57) ABSTRACT

A grid frequency rate limiting system for a droop governor is disclosed, the grid frequency rate limiting system including: a rate limit calculator for: obtaining data including at least one of: a transient power response requirement indicator, a turbo-generator power level indicator, a grid stability indicator, a fuel transfer indicator, a combustion mode timing indicator, or a temperature matching indicator; and defining rate limits according to the obtained data; a rate limiter operably connected to the rate limit calculator, the rate limiter for: obtaining a grid frequency reading associated with a grid frequency of an electrical grid; obtaining the defined rate limits; and filtering the grid frequency using the defined rate limits to provide a filtered frequency; and a droop governor operably connected to the grid frequency rate limiting system, the droop governor for: obtaining the filtered frequency; and providing a power response to the electrical grid based upon the filtered frequency.

19 Claims, 3 Drawing Sheets

GRID FREQUENCY RATE LIMITING SYSTEM

BACKGROUND OF THE INVENTION

The disclosure relates generally to turbo-generators for electrical power generation. More particularly, the disclosure relates to a grid frequency rate limiting system and a droop governor for a turbo-generator.

Droop governors act on a turbo-generator to provide a power response to an electrical power grid in order to stabilize the power grid. The power grid requires a constant balancing of power consumption and power generation, where an imbalance is indicated by a change in grid frequency. A temporary shortage in generation is indicated by a drop in frequency. The droop governor senses this drop in frequency, and increases the power output of the turbo-generator to compensate. Likewise, a temporary overage in generation is indicated by an increase in frequency. The droop governor senses the increase and reduces the power output of the turbo-generator to compensate. Traditionally, a plurality of droop governors act on turbo-generators on an electrical grid, and each responds in this manner in order to provide balance to the grid.

BRIEF DESCRIPTION OF THE INVENTION

A first aspect of the disclosure provides a system comprising: a grid frequency rate limiting system including: a rate limit calculator for: obtaining data including at least one of: a transient power response requirement indicator, a turbo-generator power level indicator, a grid stability indicator, a fuel transfer indicator, a combustion mode timing indicator, or a temperature matching indicator; and defining rate limits according to the obtained data; a rate limiter operably connected to the rate limit calculator, the rate limiter for: obtaining a grid frequency reading associated with a grid frequency of an electrical grid; obtaining the defined rate limits; and filtering the grid frequency using the defined rate limit to provide a filtered frequency; and a droop governor operably connected to the grid frequency rate limiting system, the droop governor for: obtaining the filtered frequency; and providing a power response to the electrical grid based upon the filtered frequency.

A second aspect of the disclosure provides a power generation system comprising: a turbo-generator; and a grid frequency rate limiting system including: a rate limit calculator for: obtaining data including at least one of: a transient power response requirement indicator, a turbo-generator power level indicator, a grid stability indicator, a fuel transfer indicator, a combustion mode timing indicator, or a temperature matching indicator; and defining rate limits according to the obtained data; a rate limiter operably connected to the rate limit calculator, the rate limiter for: obtaining a grid frequency reading associated with a grid frequency of an electrical grid; obtaining the defined rate limits; and filtering the grid frequency using the defined rate limits to provide a filtered frequency; and a droop governor operably connected to the grid frequency rate limiting system, the droop governor for: obtaining the filtered frequency; and providing a power response to the electrical grid based upon the filtered frequency.

A third aspect of the disclosure provides a program product stored on a computer readable medium, which when executed by at least one computing device, performs the following: obtains a grid frequency signal from an electrical grid; obtains data including at least one of: a transient power response requirement indicator, a turbo-generator power level indicator, a grid stability indicator, a fuel transfer indicator, a combustion mode timing indicator, or a temperature matching indicator; determines rate limits for filtering the grid frequency signal using the obtained data; filters the grid frequency signal according to the rate limits; and provides the filtered signal for use by a droop governor.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
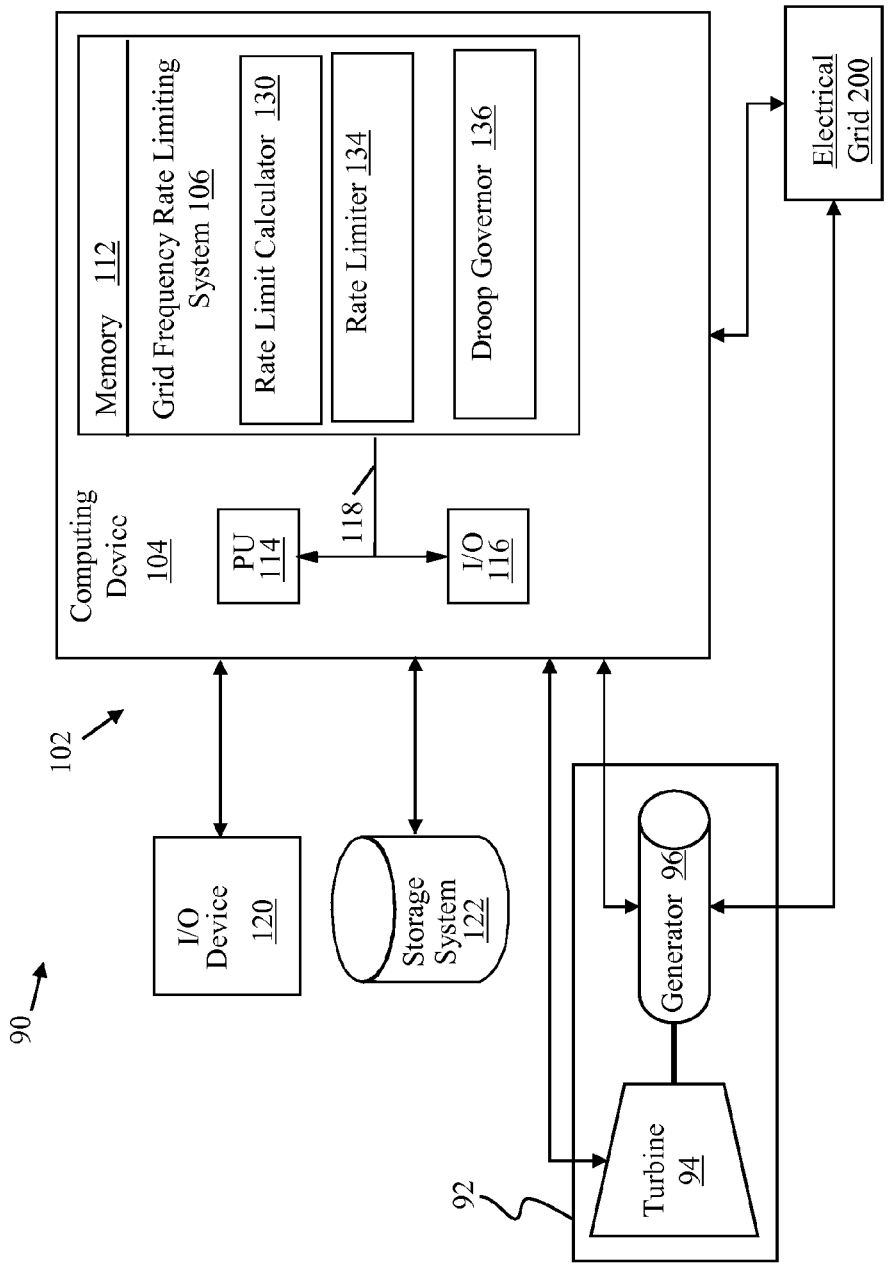
FIG. 1 shows an environment including a grid frequency rate limiting system according to embodiments of the invention.

As indicated above, the disclosure provides a grid frequency rate limiting system for providing a filtered frequency to a droop governor according to at least one parameter.

As will be appreciated by one skilled in the art, the grid frequency rate limiting system described herein may be embodied as a system(s), method(s) or computer program product(s), e.g., as part of an overall control system for a turbo-generator. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described herein with reference to data flow illustrations and/or block diagrams of methods, apparatus (systems) and computer program products according to embodiments of the invention. It will be understood that each block of the data flow illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 shows an illustrative environment 90 for a turbo-generator 92. As illustrated, turbo-generator 92 includes a turbine 94 coupled to a generator 96. It is understood that each part may include any now known or later developed structure required for its operation. For example, turbine 94 may include a gas turbine and/or a steam turbine, etc., with any number of low, intermediate or high pressure sections. Environment 90 includes a computer infrastructure 102 that can perform the various processes described herein. In particular, computer infrastructure 102 is shown including a computing device 104 that comprises a grid frequency rate limiting system 106, which enables computing device 104 to set the rate limits of a rate limiter 134 by performing the process steps of the disclosure.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as grid frequency rate limiting system 106, that is stored in memory 112 and/or storage system 122. While executing computer program code, processor 114 can read and/or write data, such as temperature data or grid frequency data, to/from memory 112, storage system 122, and/or I/O interface 116. Bus 118 provides a communications link between each of the components in computing device 104. I/O device 120 can comprise any device that enables a user to interact with computing device 104 or any device that enables computing device 104 to communicate with one or more other computing devices. Input/output devices (including but not limited to keyboards, displays, pointing devices, etc.) can be coupled to the system either directly or through intervening I/O controllers.

In any event, computing device 104 can comprise any general purpose computing article of manufacture capable of executing computer program code installed by a user (e.g., a personal computer, server, handheld device, etc.). However, it is understood that computing device 104 and grid frequency rate limiting system 106 are only representative of various possible equivalent computing devices that may perform the various process steps of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed further below, grid frequency rate limiting system 106 enables computing infrastructure 102 to perform, among other things, the rate limiting functions described herein. To this extent, grid frequency rate limiting system 106 is shown including a rate limit calculator 130, a rate limiter 134, and a droop governor 136. Operation of each of these components and related methods and systems is discussed further below. However, it is understood that some of the various components shown in FIG. 1 can be implemented independently, combined, and/or stored in memory for one or more separate computing devices that are included in computer infrastructure 102. Further, it is understood that some of the components and/or functionality may not be implemented, or additional schemas and/or functionality may be included as part of environment 90.

Generally speaking, knowledge of two attributes of a droop governor may be helpful in understanding at least one aspect of the invention. The first attribute of a droop governor is its droop setting. This attribute is usually expressed in percentage, and has a value approximately in the range of 2-20%. The droop setting indicates the amount of grid frequency change that induces the droop governor to drive the turbo-generator across its full power range. Smaller frequency changes produce proportionately smaller power responses. The droop setting, however, is considered on a quasi-steady-state basis. That is, the droop setting is determined for a scenario in which the grid frequency change persists long enough that the turbo-generator response has settled to a constant value. For example, if a droop governor had a droop setting of 4%, and the grid frequency changed by 2% and remained there for a period, the turbo-generator power response would eventually settle at one half of its power range (assuming no boundaries were encountered).

However, the second attribute of a droop governor is indicated by the transient response that it produces. The transient response is the trajectory of turbo-generator power versus time as the turbo-generator moves from an initial condition in response to a grid frequency change. If a grid frequency change persists long enough, the transient response always settles to the response indicated by the droop setting. The transient response may be affected by the transient behavior of grid frequency and by various parameters within the droop governor. The transient response may also be affected by filtering or rate-limiting the grid frequency signal that goes into the droop governor. This is the focus of at least one aspect of the invention.

Figure 2:
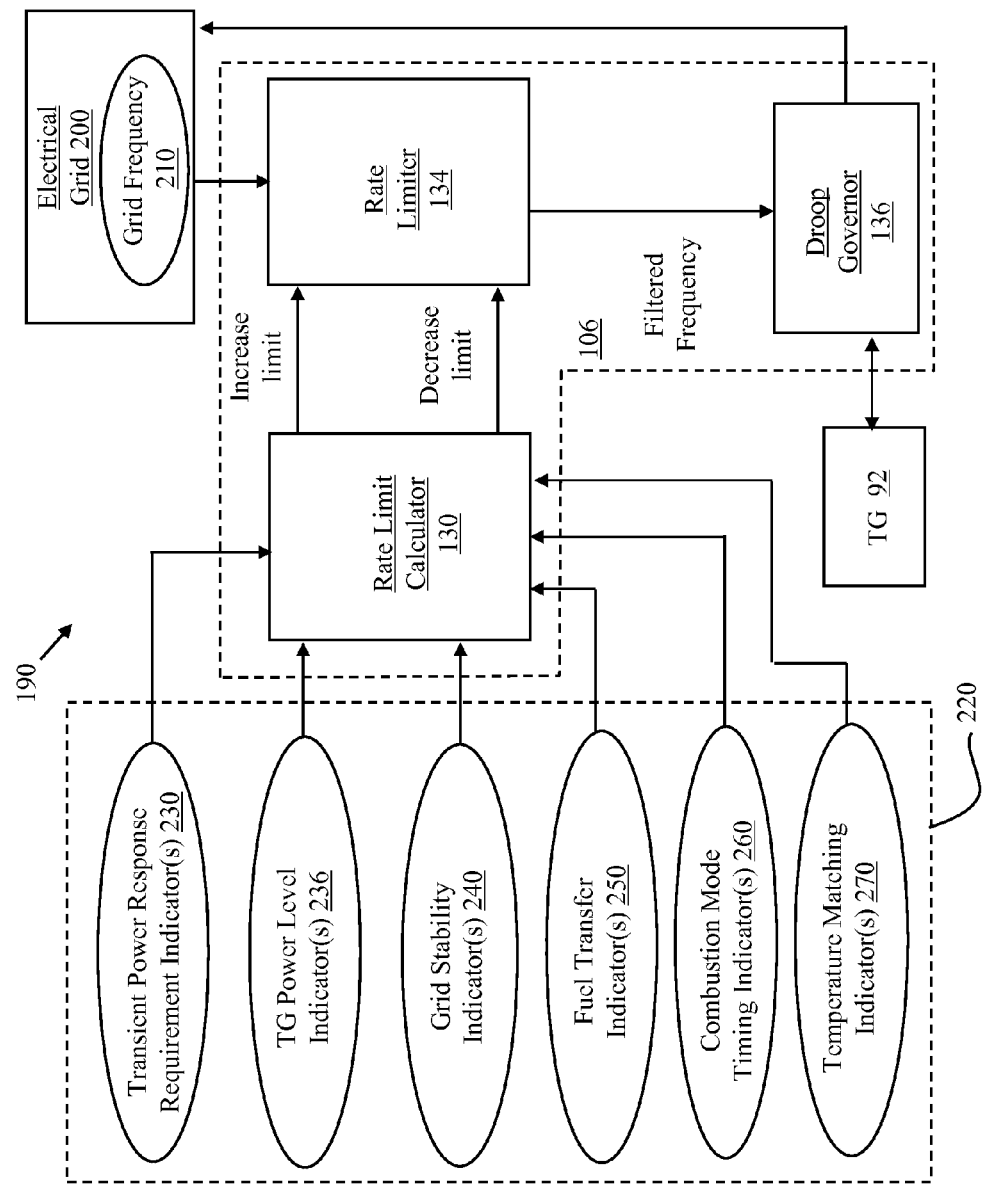
FIGS. 2-3 show schematic data flow diagrams according to embodiments.

Grid frequency rate limiting system 106 acts on the frequency/speed input to droop governor 136, keeping droop governor 136 from responding to some dynamic aspects of grid frequency variation. The rate limit calculator 130 calculates rate limits based upon real-time conditions (e.g., parameters 220, FIG. 2). For example, turning to FIG. 2, a data flow diagram 190 is shown illustrating rate limit calculator 130, rate limiter 134 operably connected (e.g., via wireless or hard-wired means) to rate limit calculator 130, droop governor 136, and electrical grid 200, and TG 92 operably connected (e.g., via wireless or hard-wired means) to droop governor 136. Also shown in data flow diagram 190 are data objects (representing parameters 220) including grid frequency 210, transient power response requirement indicator(s) 230, grid stability indicator(s) 240, fuel transfer indicator(s) 250, combustion mode timing indicator(s) 260, turbo-generator (TG) power level indicator(s) 236, and temperature matching indicator(s) 270.

Rate limit calculator 130 is configured to obtain data including at least one parameter 220, and define rate limits based upon the at least one parameter 220. Parameters 220 may be obtained using conventional methods known in the art. For example, parameters 220 may be obtained by monitoring one or more components of TG 92 as well as electrical grid 200. Parameters 220 may be obtained using one or more conventional sensors (e.g., optical, electrical, mechanical, etc.), and may take any form of data capable of being processed by rate limit calculator 130. Rate limit calculator 130 may obtain one or more parameters (data) 220 and define rate limits based upon the obtained parameter 220. In one embodiment, rate limit calculator 130 may send separate increasing and decreasing rate limits to rate limiter 134. Rate limiter 134 may then filter grid frequency 210 received from electrical grid 200 according to the rate limits, and provide that filtered frequency to droop governor 136. Droop governor 136 may then provide a power response to electrical grid 200 based upon the filtered frequency received from rate limiter 134.

For example, in one embodiment, transient power response requirement indicator 230 may be obtained from a component configured to monitor the power output of TG 92. Where a power output of TG 92 is indicated as being above a desired level, rate limit calculator 130 may calculate a higher rate limit and send the higher rate limit to rate limiter 134. Conversely, where a power output of TG 92 is indicated as being below a desired level, rate limit calculator 130 may calculate a lower rate limit and send the lower rate limit to rate limiter 134. Rate limiter 134 may then filter grid frequency 210 received from electrical grid 200 according to the modified rate limits. This filtered frequency (filtered according to higher or lower limit) is then provided to droop governor 136 in order to allow droop governor 136 to provide a power response to the electrical grid 200.

In another embodiment, rate limit calculator 130 may calculate a higher or lower rate limit based upon a TG power level indicator 236 (which may also be used in part to calculate transient power response requirement indicator 230, as described further herein). TG power level indicator 236 may indicate a power level of the turbo-generator. Where TG power level indicator 236 indicates a power level of TG 92 is above a desired level, rate limit calculator 130 may calculate a higher rate limit and send the higher rate limit to rate limiter 134. Conversely, where TG power level indicator 236 indicates a power level of TG 92 is below a desired level, rate limit calculator 130 may calculate a lower rate limit and send the lower rate limit to rate limiter 134. Rate limiter 134 may then filter grid frequency 210 received from electrical grid 200 according to the modified rate limits. This filtered frequency (filtered according to higher or lower limit) is then provided to droop governor 136 in order to allow droop governor 136 to provide a power response to the electrical grid 200.

In another embodiment, grid stability indicator 240 may be obtained from a component configured to monitor the stability of electrical grid 200. For example, a grid stability calculator monitoring one or more of grid frequency or grid voltage may be used to provide a grid stability indicator 240. Where electrical grid 200 is deemed stable, rate limit calculator 130 may determine a higher rate limit. Where electrical grid 200 is deemed unstable, rate limit calculator 130 may determine a lower rate limit. Rate limiter 134 may then filter grid frequency 210 received from electrical grid 200 according to the modified rate limit. This filtered frequency (filtered according to increased or decreased limit) is then provided to droop governor 136 in order to allow droop governor 136 to provide a power response to the electrical grid 200.

In another embodiment, fuel transfer indicator 250 may be obtained from a component configured to monitor the transfer of fuel within TG 92. For example, fuel transfer indicator 250 may be obtained from a control system managing the usage of different fuel types. Where a fuel transfer is indicated by fuel transfer indicator 250, increasing and decreasing rate limits may be set to zero (0) (no increase, no decrease). In this case, when these zero values pass to the rate limiter 134, the values may effectively freeze the output of rate limiter 134, which in turn may effectively freeze the droop governor's (136) power response to the electrical grid 200.

Figure 3:
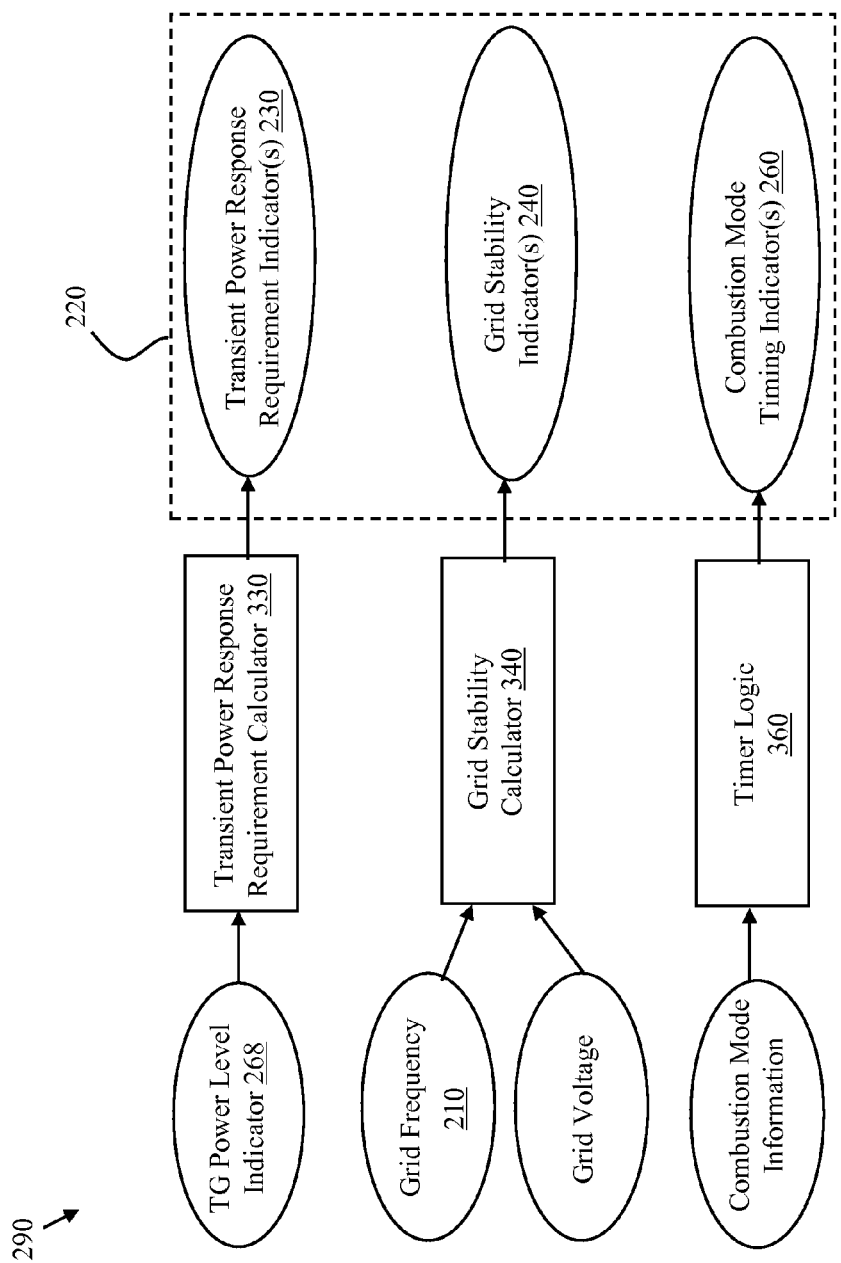

In another embodiment, combustion mode timing indicator 260 may be obtained from a component configured to monitor a combustion section within TG 92 including timer logic (FIG. 3, element 360). Combustion mode timing indicator 260 may indicate the amount of time elapsed since TG 92 has transitioned into or out of a combustion mode. In one embodiment, combustion mode timing indicator 260 may indicate whether a combustion section is transitioning out of an emissions-compliant combustion mode. In response to combustion mode timing indicator 260 indicating that a combustion section is transitioning out of an emissions-compliant combustion mode, rate limit calculator 130 may set the decreasing rate limit to zero (0), such that rate limiter 134 will not decrease its output during this period, which may effectively prevent droop governor 136 from driving TG 92 back into emissions-compliant combustion mode during this period.

In another embodiment, temperature matching indicator 270 may be obtained from a control system managing the matching of gas turbine exhaust temperature to limitations of downstream equipment. Where temperature matching indicator 270 indicates that temperature matching is active, increasing and decreasing rate limits may be set to zero (0) (no increase, no decrease). In this case, when these zero values pass to the rate limiter 134, the zero values may effectively freeze the output of rate limiter 134, which in turn may effectively freeze the droop governor's (136) power response to the electrical grid 200.

As described herein, parameters 220 may be obtained and/or calculated using any conventional methods. Turning to FIG. 3, a data flow diagram 290 is shown illustrating determination of one or more parameters 220. In one embodiment, transient power response indicator 230 is calculated by transient power response requirement calculator 330. Transient power response requirement calculator 330 may use, for example, a TG power level indicator (for TG 92) to calculate the transient power response requirement indicator 230. Also shown in FIG. 3 is a grid stability calculator 340, which is configured to obtain grid frequency 210 and/or a grid voltage reading and calculate an indicator 240 of grid stability. The grid stability determination can be based on, for example, a comparison of an instantaneous grid frequency and/or grid voltage to an historical attribute such as an historical average over a set period of time, or a filter frequency or filter voltage value. Finally, FIG. 3 also shows timer logic 360 configured to obtain combustion mode information and generate combustion mode timing indicator 260. For example, the indicator may indicate whether at least a certain amount of time has elapsed since a change in the combustion mode.

As is understood from the description herein, the appropriate increasing limit or decreasing limit output by rate limit calculator 130 can be in set terms, e.g., set to 0 during fuel transfer underway or within a predetermined time of combustion mode transfer. Alternatively, the rate limits can be a variable amount. Where different factors indicate varied rate limits, rate limit calculator 130 may calculate a combined rate limit, e.g., by averaging or other combinatorial techniques, selecting one factor over the other based on a prioritization of factors, etc.

In any event, grid frequency rate limiting system 106 enables the optimization of the transient turbo-generator (TG 92) power output in response to grid frequency variations. This optimization is a balance between requirements and capabilities. For example, sometimes the transient power response requirement set by the grid regulating authority is a function of a TG 92 operating condition. In this case, TG 92 could be set up to deliver a constant transient power response that is equal to or higher than the highest variable requirement. Grid frequency rate limiting system 106, however, enables TG 92 to match its response to the requirement, thereby not delivering substantially more response than is sometimes required.

In another example, it is understood that TG 92 transient capability can be a function of its operating condition. In this case, an attempt to deliver a transient response exceeding capability could result in, e.g., loss of flame (in a gas turbine) or some other operability issue. In this case, TG 92 could be configured to deliver a constant transient power response that is equal to or lower than its lowest variable capability. In this case, however, grid frequency rate limiting system 106 enables TG 92, via droop governor 136, to match its response to its capability, thereby maximizing its response without taking undue risk of an operability issue.

Grid frequency rate limiting system 106 also enables the prevention of transient power responses that could be counter-productive to grid stability. For example, it is possible for grid frequency 210 to oscillate in such a way that TG 92 power response lags by such a time frame that the response is actually in the wrong direction for a period.

Grid frequency rate limiting system 106 ensures the stability (operability) of TG 92 in response to a variety of grid frequency variations, while still delivering transient power response that provides appropriate grid stabilization support.

The data flow diagram and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., temperatures, grid frequency, etc.). It is understood that the corresponding data can be obtained using any solution. For example, the corresponding system/component can generate and/or be used to generate the data, retrieve the data from one or more data stores or sensors (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
    a grid frequency rate limiting system including:
        a rate limit calculator for:
            obtaining data including at least one of: a transient power response requirement indicator, a turbo-generator power level indicator, a grid stability indicator, a fuel transfer indicator, a combustion mode timing indicator, or a temperature matching indicator; and
            defining rate limits according to the obtained data;
        a rate limiter operably connected to the rate limit calculator, the rate limiter for:
            obtaining a grid frequency reading associated with a grid frequency of an electrical grid;
            obtaining the defined rate limits; and
            filtering the grid frequency using the defined rate limits to provide a filtered frequency, wherein the filtered frequency is bounded by the defined rate limits; and
        a droop governor operably connected to the grid frequency rate limiting system, the droop governor for:
            obtaining the filtered frequency; and
            providing a power response to the electrical grid based upon the filtered frequency.

2. The system of claim 1, further comprising a transient power response requirement calculator for obtaining a turbo-generator power level indicator and calculating the transient power response requirement.

3. The system of claim 1, further comprising a grid stability calculator for obtaining at least one of the grid frequency reading or a grid voltage reading from the electrical grid before the obtaining of the grid frequency reading by the rate limiter, the grid stability calculator generating the grid stability indicator using the at least one of the grid frequency reading or the grid voltage reading.

4. The system of claim 1, further including timer logic for obtaining combustion mode information from a turbo-generator and generating the combustion mode timing indicator.

5. The system of claim 1, wherein the defining of the rate limits includes an increasing rate limit.

6. The system of claim 1, wherein the defining of the rate limits includes a decreasing rate limit.

7. A power generation system comprising:
    a turbo-generator; and
    a grid frequency rate limiting system including:
        a rate limit calculator for:
            obtaining data including at least one of: a transient power response requirement indicator, a turbo-generator power level indicator, a grid stability indicator, a fuel transfer indicator, a combustion mode timing indicator, or a temperature matching indicator; and
            defining rate limits according to the obtained data;
        a rate limiter operably connected to the rate limit calculator, the rate limiter for:
            obtaining a grid frequency reading associated with a grid frequency of an electrical grid;
            obtaining the defined rate limits; and
            filtering the grid frequency using the defined rate limits to provide a filtered frequency, wherein the filtered frequency is bounded by the defined rate limits; and
        a droop governor operably connected to the grid frequency rate limiting system, the droop governor for:
            obtaining the filtered frequency; and
            providing a power response to the electrical grid based upon the filtered frequency.

8. The system of claim 7, further comprising a transient power response requirement calculator for obtaining a power level indicator of the turbo-generator and calculating the transient power response requirement.

9. The system of claim 7, further comprising a grid stability calculator for obtaining at least one of the grid frequency reading or a grid voltage reading from the electrical grid before the obtaining of the grid frequency reading by the rate limiter, the grid stability calculator generating the grid stability indicator using the at least one of the grid frequency reading or the grid voltage reading.

10. The system of claim 7, further including timer logic for obtaining combustion mode information from a turbo-generator and generating the combustion mode timing indicator.

11. The system of claim 7, wherein the defining of the rate limits includes an increasing rate limit.

12. The system of claim 7, wherein the defining of the rate limits includes a decreasing rate limit.

13. A program product stored on a non-transitory computer readable medium, which when executed by at least one computing device, performs the following:
    obtains a grid frequency signal from an electrical grid;
    obtains data including at least one of: a transient power response requirement indicator, a turbo-generator power level indicator, a grid stability indicator, a fuel transfer indicator, a combustion mode timing indicator, or a temperature matching indicator;
    defines rate limits for filtering the grid frequency signal using the obtained data;
    filters the grid frequency signal according to the rate limits, wherein the filtered grid frequency signal is bounded by the defined rate limits; and
    provides the filtered signal for use by a droop governor.

14. The program product of claim 13, wherein the program product further performs the following:
   instructs the droop governor to use the filtered signal instead of the grid frequency signal in providing a power response to the electrical grid.

15. The program product of claim 14, wherein the program product further performs the following:
   obtains a power level indicator for a turbo-generator and calculates the transient power response requirement.

16. The program product of claim 13, wherein the program product further performs the following:
   generates the grid stability indicator using the grid frequency signal or a grid voltage.

17. The program product of claim 13, wherein the program product further performs the following:
   obtains combustion mode information from the turbo-generator and generates the combustion mode timing indicator.

18. The program product of claim 13, wherein the defining of the rate limits includes an increasing rate limit.

19. The program product of claim 13, wherein the defining of the rate limits includes a decreasing rate limit.

* * * * *